(12) United States Patent
Kurapati et al.

(10) Patent No.: US 8,705,720 B2
(45) Date of Patent: Apr. 22, 2014

(54) SYSTEM, METHOD AND APPARATUS FOR CLIENTLESS TWO FACTOR AUTHENTICATION IN VOIP NETWORKS

(75) Inventors: Srikrishna Kurapati, Richardson, TX (US); Guru-Prasad Thodime-Venkata, Richardson, TX (US); Satyam Tyagi, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 1567 days.

(21) Appl. No.: 12/028,781

(22) Filed: Feb. 8, 2008

(65) Prior Publication Data
US 2009/0168756 A1 Jul. 2, 2009

Related U.S. Application Data

(60) Provisional application No. 60/888,765, filed on Feb. 8, 2007.

(51) Int. Cl.
*H04M 1/56* (2006.01)
*H04M 15/06* (2006.01)
*H04M 3/42* (2006.01)
*H04M 7/00* (2006.01)

(52) U.S. Cl.
USPC ............ 379/207.13; 379/142.05; 379/201.01; 379/207.02; 379/207.11; 379/219

(58) Field of Classification Search
USPC .................. 379/90.02, 93.02, 93.03, 142.05, 379/114.14, 127.02, 142.06, 145, 167.06, 379/184, 194, 196, 201.01, 207.11, 207.13
See application file for complete search history.

(56) References Cited

U.S. PATENT DOCUMENTS

| | | | |
|---|---|---|---|
| 6,363,065 B1 | 3/2002 | Thornton et al. | |
| 6,542,601 B1 * | 4/2003 | Hernandez et al. | 379/265.01 |
| 6,665,293 B2 | 12/2003 | Thornton et al. | |
| 6,757,823 B1 | 6/2004 | Rao et al. | |
| 6,842,449 B2 | 1/2005 | Hardjono | |
| 7,171,460 B2 | 1/2007 | Kalavade et al. | |
| 7,310,813 B2 | 12/2007 | Lin et al. | |
| 2002/0064149 A1 * | 5/2002 | Elliott et al. | 370/352 |
| 2002/0129236 A1 | 9/2002 | Nuutinen | |
| 2003/0009699 A1 | 1/2003 | Gupta et al. | |
| 2003/0043984 A1 * | 3/2003 | Lauzon | 379/144.01 |
| 2004/0001579 A1 * | 1/2004 | Feinberg et al. | 379/156 |
| 2004/0086093 A1 | 5/2004 | Schranz | |

(Continued)

OTHER PUBLICATIONS

Official Action for U.S. Appl. No. 12/603,236, mailed Aug. 22, 2012 20 pages.

(Continued)

*Primary Examiner* — Khai N Nguyen
(74) *Attorney, Agent, or Firm* — Sheridan Ross P.C.

(57) ABSTRACT

The present invention provides a system, method and apparatus for authenticating an Internet Protocol (IP) phone and a user of the IP phone by determining whether the IP phone is an authorized device, and whenever the IP phone is authorized and a trigger condition occurs, determining whether the user of the IP phone is authorized. The user authorization process initiates a call to the IP phone, sends a request for a passcode to the IP phone, sends a message to disable the IP phone whenever the passcode is invalid, and terminates the call. The user authentication process uses an in-band channel and the IP phone does not run a two factor authentication client application during the authentication process.

20 Claims, 7 Drawing Sheets

(56) References Cited

U.S. PATENT DOCUMENTS

| | | |
|---|---|---|
| 2004/0161086 A1 | 8/2004 | Buntin et al. |
| 2004/0260560 A1 | 12/2004 | Holloway et al. |
| 2005/0132060 A1 | 6/2005 | Mo et al. |
| 2005/0180403 A1* | 8/2005 | Haddad et al. ............... 370/352 |
| 2005/0185639 A1* | 8/2005 | Lee et al. ..................... 370/352 |
| 2005/0201363 A1 | 9/2005 | Gilchrist et al. |
| 2006/0028980 A1 | 2/2006 | Wright |
| 2006/0036727 A1 | 2/2006 | Kurapati et al. |
| 2006/0229062 A1* | 10/2006 | Lai et al. ...................... 455/411 |
| 2007/0076853 A1 | 4/2007 | Kurapati et al. |
| 2007/0121596 A1 | 5/2007 | Kurapati et al. |
| 2008/0016334 A1 | 1/2008 | Kurapati et al. |
| 2008/0016515 A1 | 1/2008 | Naim et al. |
| 2008/0141284 A1* | 6/2008 | Tomizu ......................... 719/321 |
| 2008/0152098 A1* | 6/2008 | Paryzek et al. ............ 379/93.02 |
| 2010/0107230 A1 | 4/2010 | Tyagi et al. |

OTHER PUBLICATIONS

Notice of Allowance for U.S. Appl. No. 12/603,236, mailed Feb. 4, 2013 11 pages.

Stein, L. D. and Stewart, J. N., "The World Wide Web Security FAQ, Version 3.1.2, Feb. 4, 2002," http://www.w3.org/Security/Faq/.

Tyson, Jeff and Valdes, Robert, "How VoIP Works" http://computer.howstuffworks.com/ip-telephony.htm, Jul. 9, 2007.

* cited by examiner

Virtual IP Configuration :IPCS_OO1                                    Add VIP Rule

| Protocol | Transport | VIP | Encapsulate VIP | Encapsulated VIP | IPCS IP | Remote IP | | |
|---|---|---|---|---|---|---|---|---|
| Skinny | TCP | 172.16.181.10:2000 | Yes | Same as incoming | 172.16.181.10 | 10.10.0.5:2000 | | ✕ |
| TFTP | UDP | 172.16.181.10:69 | No | NA | 172.16.181.10 | 10.10.0.5:2000 | | ✕ |

FIG. 6

SYSTEM, METHOD AND APPARATUS FOR CLIENTLESS TWO FACTOR AUTHENTICATION IN VOIP NETWORKS

FIELD OF THE INVENTION

The present invention relates generally to the field of telecommunications and, more particularly, to a system, method and apparatus for clientless two factor authentication in voice-over-Internet-Protocol (VOIP) networks.

PRIORITY CLAIM

This patent application is a non-provisional application of U.S. provisional patent application 60/888,765 filed on Feb. 8, 2007 and entitled "System, Method and Apparatus for Two Factor Authentication in VOIP Networks," which is hereby incorporated by reference in its entirety.

BACKGROUND OF THE INVENTION

The combination of device and user authentication is called "Two Factor" authentication. Enterprises already have this mechanism in place for remote users connecting through computers. RSA SecurID® or similar mechanism is the de facto way of enabling "two factor" authentication. Two Factor authentication requires a user to key in a special pass phrase or key that is displayed on a Secure Token. This token is typically issued by the company and is carried by the employee all the time. The token is linked back to token authentication server in the company. When the employee wants to login to corporate services, he/she must supply the pass phrase or key, which changes periodically, to ensure that only the employee is requesting the service. The supplied input data is validated against the authentication server and if the match occurs, the employee is granted the service. RSA tokens and RSA server are widely deployed two factor authentication mechanisms in corporations.

This above-mentioned technique works well for computer terminals as there are client applications built to accept the two factor authentication. There is, however, no client or the user interface to allow two factor authentication on phones. Unlike traditional phones that are always tied to a physical wire connected to PBX/Switch, the new breed of phones are Internet Protocol (IP) enabled and thus provide portability and mobility. For example, an employee can carry an IP Phone from his work and plug it into Ethernet connector at home and can access an entity's network. This flexibility enables businesses or other entities to deploy these phones to tele-workers, road warriors, consultants, partners and other. On the other hand, it makes these entities vulnerable to theft, attacks, and abuse. As a result, there is a need for a clientless two factor authentication for IP-based phones.

SUMMARY OF THE INVENTION

The present invention when applied in conjunction with deeper security threat mitigation creates a highly secure telephony that can be provided anywhere outside the corporation. As a result, entities can realize business continuity and the benefits of pervasive communications. The two factor authentication must be carried out in a secure channel between the phone and the entity as the phone is typically on the Internet. In addition, the voice conversation must be encrypted for privacy. With new IP Phone terminals and soft phones this is achieved through encrypted transport. Other techniques such as Virtual Private Network (VPN) based access require clients on the phone or additional VPN devices to maintain that restrict the IP Phone support and the usage. The present invention leverages the same control messages and voice prompts used for setting up calls to the phone to provide two factor authentication. Thus, neither a client on the phone nor an out-of-band channel is necessary to complete two factor authentication.

The present invention provides a method for authenticating an IP phone and a user of the IP phone by determining whether the IP phone is an authorized device, and whenever the IP phone is authorized and a trigger condition occurs, determining whether the user of the IP phone is authorized. The user authorization process initiates a call to the IP phone, sends a request for a passcode to the IP phone, sends a message to disable the IP phone whenever the passcode is invalid, and terminates the call. The user authentication process uses an in-band channel and the IP phone does not run a two factor authentication client application during the authentication process.

The present invention also provides an apparatus for authenticating an IP phone and a user of the IP phone that includes a communications interface, a memory, and a processor communicably coupled to the communications interface and the memory. The processor is configured to determine whether the IP phone is an authorized device, and determine with the user is authorized whenever the IP phone is authorized and a trigger condition occurs. The processor authenticates the user of the IP phone by initiating a call to the IP phone via the communications interface, sending a request for a passcode to the IP phone via the communications interface, sending a message to disable the IP phone via the communications interface whenever the passcode is invalid, and terminating the call. The user authentication process uses an in-band channel and the IP phone does not run a two factor authentication client application during the authentication process.

In addition, the present invention provides a system that includes one or more IP phones, a security server, and an Internet Protocol network communicably coupling the one or more IP phones to the security server. The security server includes a communications interface, a memory and a processor communicably coupled to the communications interface and the memory. The processor is configured to determine whether the IP phone is an authorized device, and determine with the user is authorized whenever the IP phone is authorized and a trigger condition occurs. The processor authenticates the user of the IP phone by initiating a call to the IP phone via the communications interface, sending a request for a passcode to the IP phone via the communications interface, sending a message to disable the IP phone via the communications interface whenever the passcode is invalid, and terminating the call. The user authentication process uses an in-band channel and the IP phone does not run a two factor authentication client application during the authentication process.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 6 is screen shot of a virtual IP configuration table in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to clientless two factor authentication using RSA SecurID® and Cisco CallManager (CCM), but it will be understood that the concepts of the present invention are applicable to any clientless two factor authentication of IP phones or similar devices using any suitable authentication and IP call agent platform.

The present invention when applied in conjunction with deeper security threat mitigation creates a highly secure telephony that can be provided anywhere outside the corporation. As a result, entities can realize business continuity and the benefits of pervasive communications. The two factor authentication must be carried out in a secure channel between the phone and the entity as the phone is typically on the internet. In addition, the voice conversation must be encrypted for privacy. With new IP Phone terminals and soft phones this is achieved through encrypted transport. Other techniques such as VPN based access require clients on the phone or additional VPN devices to maintain that restrict the IP Phone support and the usage. The present invention leverages the same control messages and voice prompts used for setting up calls to the phone to provide two factor authentication. Thus, neither a client on the phone nor an out-of-band channel is necessary to complete two factor authentication.

Figure 1A:
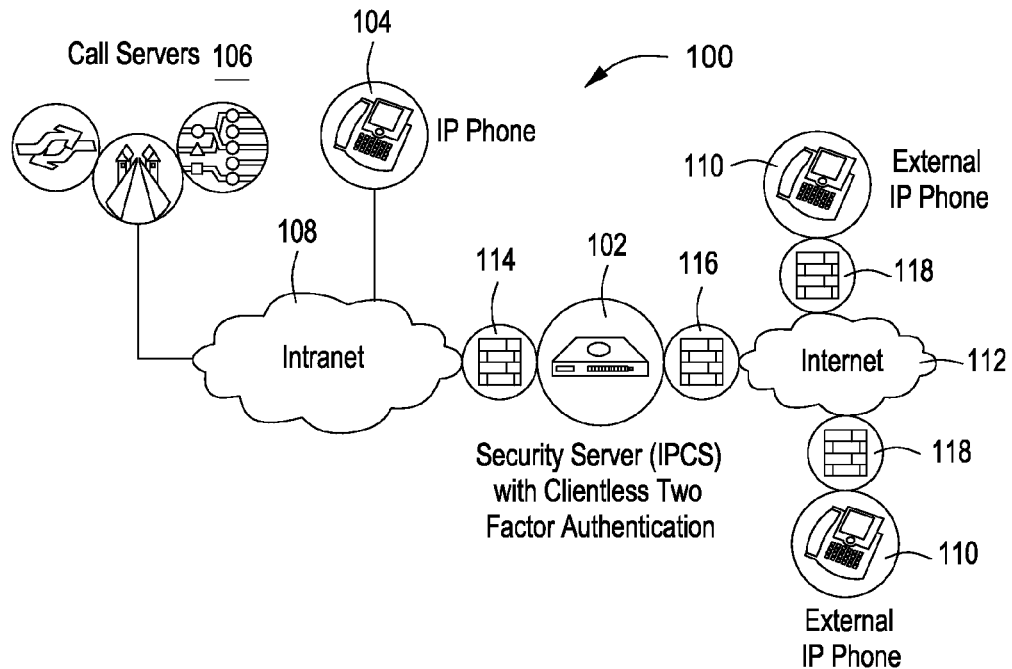
FIGS. 1A and 1B illustrate two network configurations in accordance with the present invention.
Figure 1B:
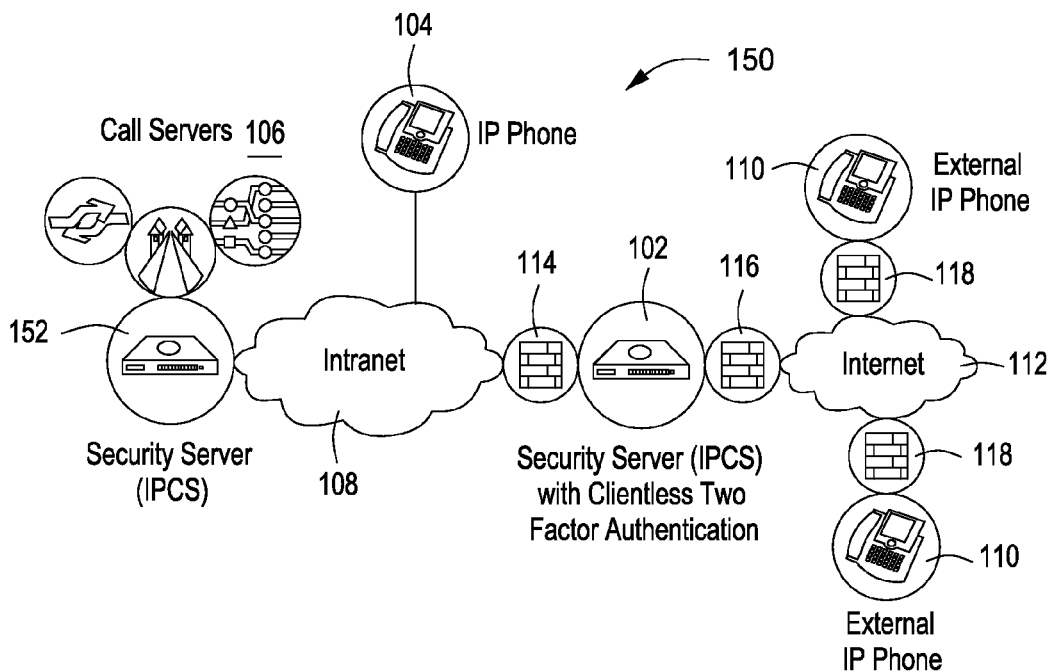

Now referring to FIGS. 1A and 1B, two network configurations in accordance with the present invention are illustrated. FIG. 1A represents the present invention in Internet Protocol Communication Security (IPCS) demilitarized zone (DMZ) mode 100. FIG. 1B represents the present invention in an IPCS in a tunnel mode 150. In either case, the present invention provides infrastructure and endpoint protection. The two factor authentication for remote users must be provided in the DMZ of enterprise. The security server 102 in the DMZ must be able to handle near-end and far-end firewall issues. The security server 102 must: (a) provide authentication connectivity to the authentication server (not shown) (e.g., SecurID® server or other suitable authentication server); (b) terminate and inspect signaling and media; and (c) be a secure box. The security server (IPCS) 102 is communicably coupled to various IP phones 104 and call servers 106 via an Intranet 108 or other IP-based communications network (internal, private or secure). Note that the security server 102 in FIG. 1B is communicably coupled to another security server 152, which is communicably coupled to the call servers 106, to establish a secure tunnel through the Intranet 108.

The security server 102 can be communicably coupled to various external IP phones 110 via the Internet 112 or other IP-based communications network (external, less-secure or public). In addition, the security server 102 is protected by an internal firewall 114 and an external firewall 116. Similarly, external IP phones 110 are protected by a firewall 118. The security server 102 includes a communications interface, a memory, and a processor communicably coupled to the communications interface and the memory. The processor is configured to perform the authentication processes described below. The IP phone 110 can be a dual mode phone, a wireless phone, a soft phone, a web phone, a personal data assistant or other IP-based telecommunications device that does not run a client-based authentication application during the authentication process described herein. Note that IP Private Branch Exchange (PBX) systems are not built to address the above requirements.

Figure 2:
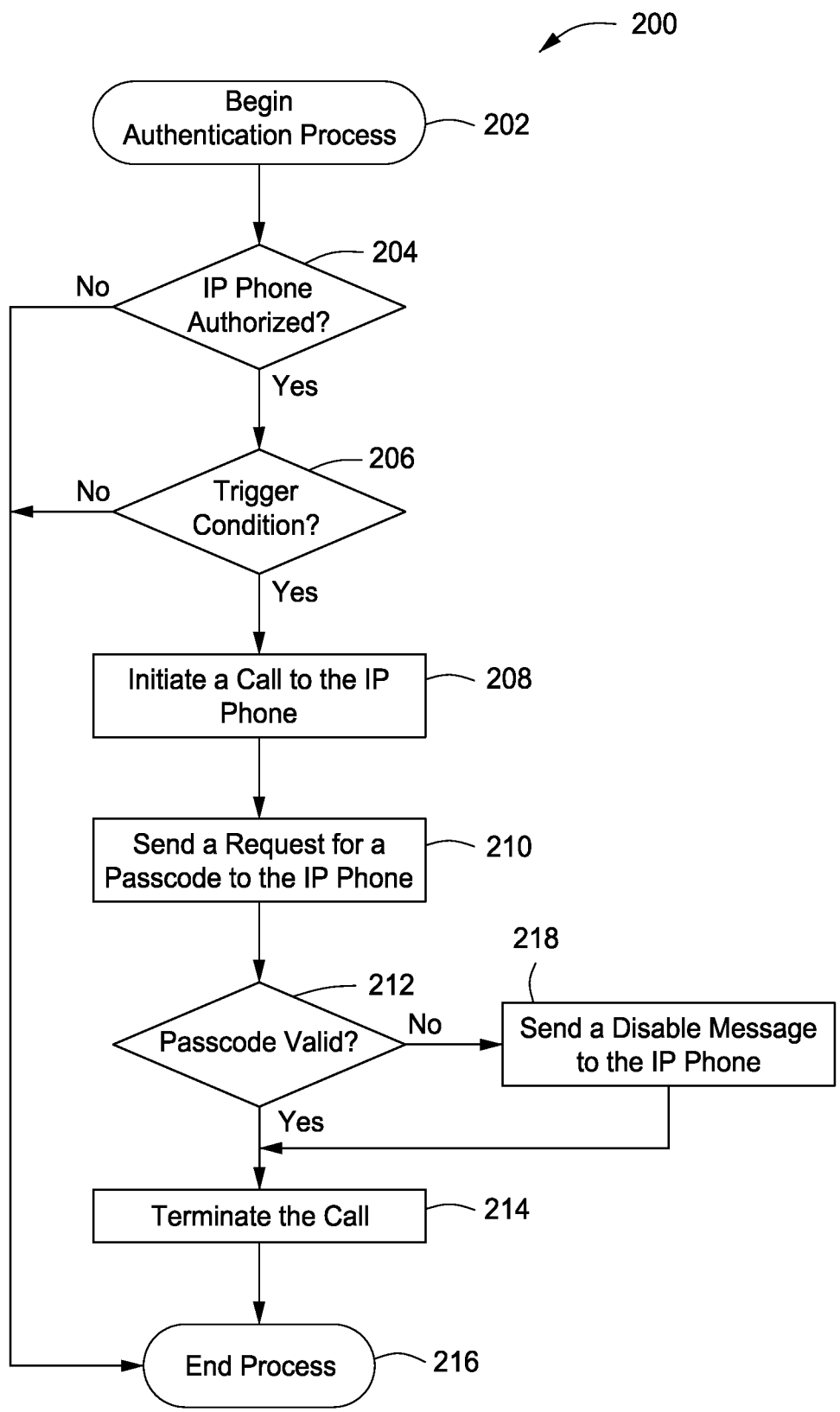
FIG. 2 is a flow chart illustrating a two factor authentication process in accordance with one embodiment of the present invention.

Referring now to FIG. 2, FIG. 2 is a flow chart illustrating a two factor authentication process 200 in accordance with one embodiment of the present invention is shown. The authentication process 200 begins in block 202. If the IP phone 110 is authorized, as determined in decision block 204, and a trigger condition occurs, as determined in decision block 206, the security server 102 initiates a call to the IP phone 110 in block 208. A "white list" or other type of commonly used device authentication can be used to authenticate the IP phone. The trigger condition can be a time-based condition, an event-based condition or a combination thereof. The time-based condition can be a requirement to authenticate the IP phone daily, weekly, bi-weekly, monthly, quarterly, yearly or some other specified time. The event-based condition can be receiving a registration request from the IP phone, a switch-over to standby, a challenge from an authentication manager, a request for a specified service, or a request for access to a specified device. If, however, the IP phone 110 is not authorized, as determined in decision block 204, or the trigger condition is not met, as determined in decision block 206, the process ends in block 216.

After the call is initiated, the secure server 102 sends a request for the user's passcode to the IP phone 110 in block 210. The request for the passcode may include one or more display prompts, one or more voice prompts or a combination thereof. The passcode can be a personal identification code, a token code, a physical key, an electronic key, a biometric identifier, a magnetic signature, an electronic signature, one or more numbers, one or more symbols, one or more alphabet characters, one or more keystrokes, or a combination thereof. If the passcode is valid, as determined in decision block 212, the call is terminated in block 214 and the process ends in block 216. If, however, the passcode is not valid, the security server 102 sends a message to the IP phone 110 that will disable the IP phone 110 in block 218. Thereafter, the call is terminated in block 214 and the process ends in block 216. After the authentication process 200 is successfully completed, the IP phone 110 will be allowed to access resources or connect to devices protected by the security server 102. Note that this process can be implemented using a computer readable medium executed by the secure server 102 wherein the steps are executed by one or more code segments.

Figure 3:
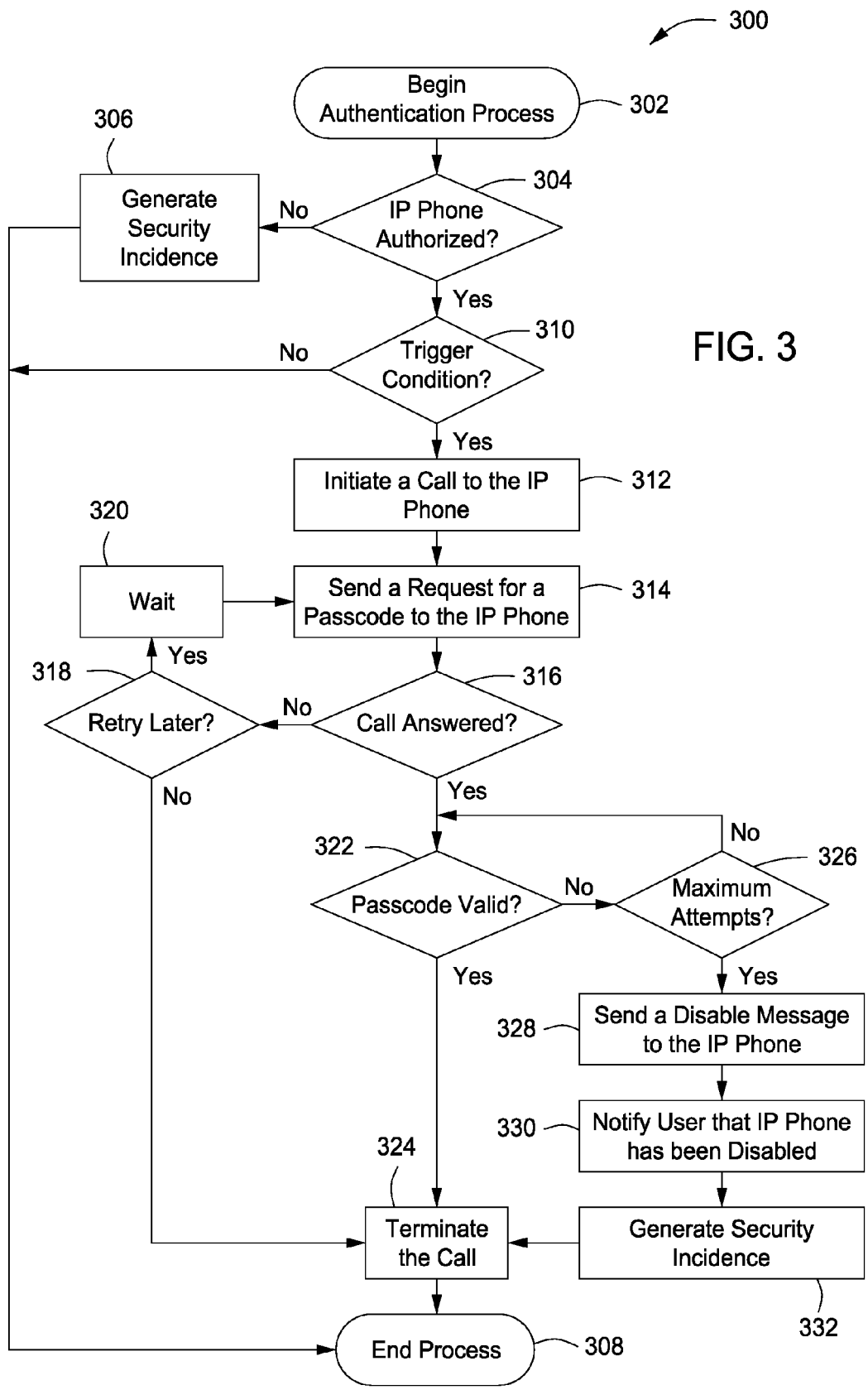
FIG. 3 is a flow chart illustrating a two factor authentication process in accordance with another embodiment of the present invention.

Now referring to FIG. 3, a flow chart illustrating a two factor authentication process 300 in accordance with another embodiment of the present invention is shown. The authentication process 300 begins in block 302. If the IP phone 110 is not authorized, as determined in decision block 304, a security incidence is generated in block 306 and the process ends in block 308. A "white list" or other type of commonly used device authentication can be used to authenticate the IP phone. If, however, the IP phone 110 is authorized, but a trigger condition does not occur (or is not satisfied), as determined in decision block 310, the process ends in block 308. The trigger condition can be a time-based condition, an event-based condition or a combination thereof. The time-based condition can be a requirement to authenticate the IP phone daily, weekly, bi-weekly, monthly, quarterly, yearly or some other specified time. The event-based condition can be receiving a registration request from the IP phone, a switch-over to standby, a challenge from an authentication manager, a request for a specified service, or a request for access to a specified device If, however, the trigger condition is satisfied, the security server 102 initiates a call to the IP phone 110 in block 312.

After the call is initiated, the secure server 102 sends a request for the user's passcode to the IP phone 110 in block 314. The request for the passcode may include one or more display prompts, one or more voice prompts or a combination thereof. The passcode can be a personal identification code, a token code, a physical key, an electronic key, a biometric identifier, a magnetic signature, an electronic signature, one or more numbers, one or more symbols, one or more alphabet characters, one or more keystrokes, or a combination thereof. If the call is not answered, as determined in decision block 316, and request retries are allowed, as determined in decision block 318, the process waits in block 320 and a new request is sent in block 314. If, however, retries are not allowed, the call is terminated in block 324 and the process ends in block 308. If, however, the call is answered, as determined in decision block 316, and the passcode is valid, as determined in decision block 322, the call is terminated in block 324 and the process ends in block 308. If, however, the passcode is not valid, and the maximum number of attempts to enter the passcode have not been exceeded, as determined in decision block 326, the user may try to enter the correct passcode. If, however, the maximum number of attempts has been made, the security server 102 sends a message to the IP phone 110 that will disable the IP phone 110 in block 328, the user is notified that the IP phone 110 has been disabled in block 330. The notification may include one or more display messages, audio messages, voice mail messages, electronic mail messages, text messages, or a combination thereof. Thereafter, a security incidence is generated in block 332, the call is terminated in block 324 and the process ends in block 308. After the authentication process 300 is successfully completed, the IP phone 110 will be allowed to access resources or connect to devices protected by the security server 102.

The security server 102 can block any messages from the IP phone 110 until the IP phone 110 and the user are authenticated. In addition, the security server 102 can initiate another call to the IP phone 110 and send another request for a passcode to the IP phone 110 after the IP phone 110 has been disabled for a specified period of time. The security server 102 can delay registration of the IP phone 110 with a call manager until the IP phone 110 and the user are authenticated. Moreover, the IP phone 110 can be enabled after the IP phone 110 has been disabled by using a "clearing" process executed by the user, a technician, a security person, a supervisor or a combination thereof. Note that this process can be implemented using a computer readable medium executed by the secure server 102 wherein the steps are executed by one or more code segments.

Figure 4:
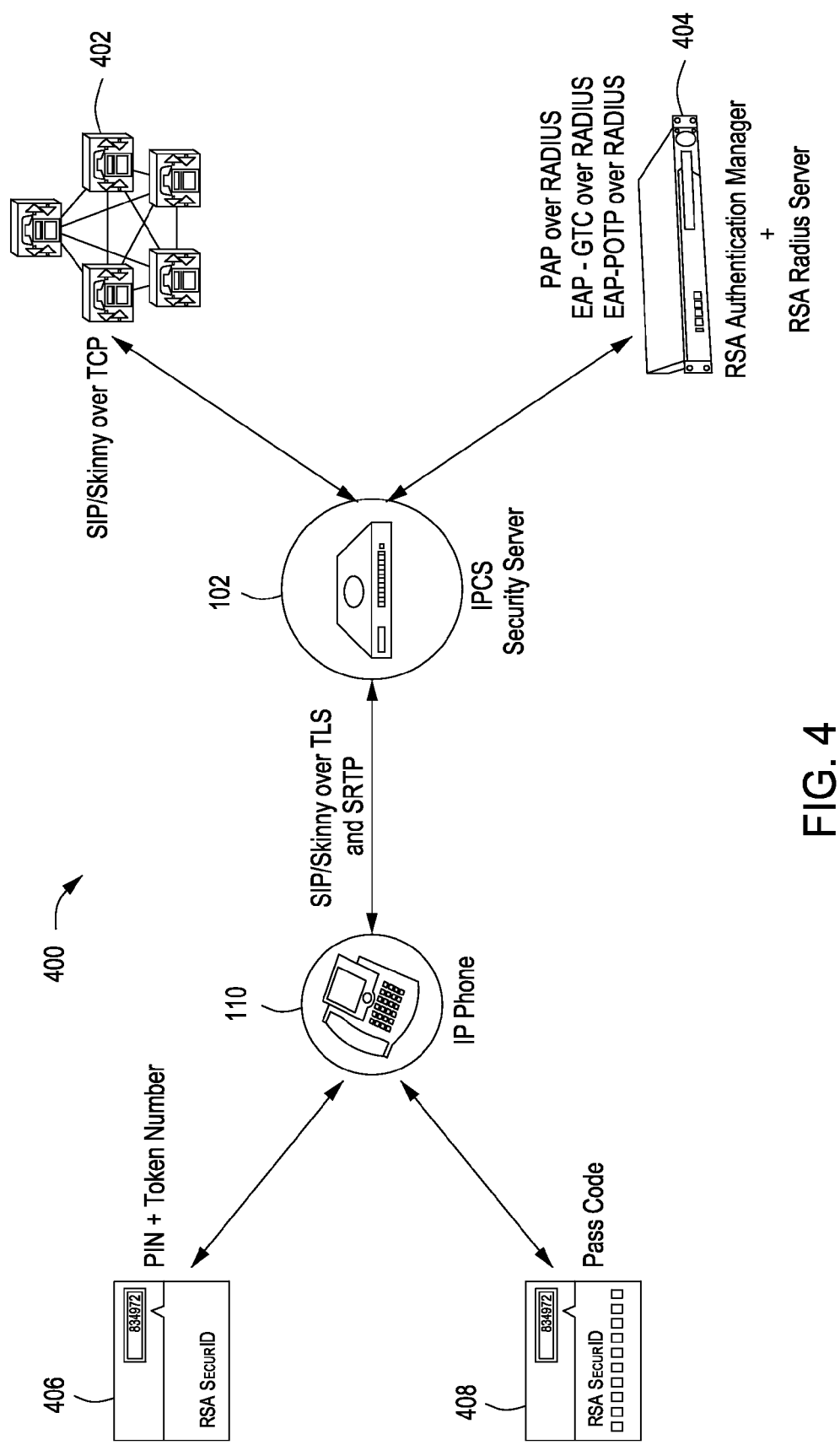
FIG. 4 illustrates a RSA SecurID® authentication network in accordance with one embodiment of the present invention.

Referring now to FIG. 4, a RSA SecurID® authentication network 400 in accordance with one embodiment of the present invention is illustrated. The system 400 includes a security server (IPCS) 102 communicably coupled to one or more protected resources, devices or phones 402 and an authentication server 404. The security server 102 is also communicably coupled to an IP phone 110. The user of the IP phone 110 has a RSA SecurID® 406 that provides a PIN+ Token Number or RSA SecurID® with pinpad 408 that provides a Pass Code. The communication protocol used between the IP phone 110 and the security server 102 is SIP/Skinny over TLS and SRTP. The communication protocol used between the security server 102 and the protected phones 402 is SIP/Skinny over TCP. The communication protocol used between the security server 102 and the authentication server 404 (RSA Authentication Manager+RSA Radius Server) is PAP over RADIUS, EAP-GTC over RADIUS and/or EAP-POTP over RADIUS. The security server 102 can request authentication of the received passcode from the authentication server 404.

The present invention can implement any of the following pre-authentication rules:
1. Perform following operations for devices in the white list. Any requests from devices not in white 1List, they are blocked and a security incidence is generated.
2. Do not allow any messages from phone to Intranet before authentication completes.
3. Serve default configuration file using Trivial File Transfer Protocol (TFTP). If the local copy is not available, use a default file that is preconfigured.
4. When phone sends Registration Request, accept it and send the success response without any interaction with CCM network. (Register phone with some default values).
5. Ring the phone and request for SecurID® key using Display Prompt. If the user doesn't pick-up the phone, then authentication should be done whenever user goes off-hook. The ring should stop after timeout 3 mins, but display and light can remain on, and when phone goes offhook the IPCS will request for passcode.
6. In the event Display prompt is not feasible with the protocol, IPCS shall request for the key using voice prompt.
7. Allow configurable number of consecutive failed-attempts to authenticate before locking the phone down.
8. If the phone is locked down, play the Lock down prompt. It should be both a display prompt and some tone. Audio is also possible.
9. Generate an incidence when the phone is locked down.
10. Use configurable timer to challenge the user to re-authenticate after locking down.
11. When the timer expires prompt for re-authentication only if the user goes off-hook. Request for secureid key using Display Prompt in the following cases:
    i. When the timer expires, ring the phone and display "Please go offhook to complete registration" don't request SecurID® passcode yet.
    ii. Whenever the user goes off-hook. Now IPCS can request SecurID® passcode.
12. If the SecurID® server rejects/challenges authentication request, IPCS shall use the prompt from "Reply-Message" attribute in the message. If prompt is too big to display a compressed format maybe used.
13. Lockdown clearing process: IPCS allows the ability to clear the lock down using "out-of-band" mechanism.
14. IPCS EMS will provide ability for help desk to login and clear the lock down.

15. In addition, IPCS will provide "Self-service" capability by providing Web Service using SOAP/XML to offer this capability and integrate with Enterprise Employee portal.
16. IPCS will display the portal URI on the phone when the user is locked down and procedure to clear it.

In addition, the following post-authentication rules can be used:

17. Once Authentication completes the phone will have same capabilities as it would have without IPCS.
18. The Re-Authentication of the phone will either be Time Based or Event based or both.
19. If it is Time based, Admin must specify either daily, weekly, bi-weekly or monthly.
20. If it is Event based Admin can select one or more events such as Phone sending Re-Registration Request, Call Manager switch-over to standby.

A RADIUS PAP RSA SecurID® Example flow is as follows:

Display Prompts on phone
To continue Phone Registration you must enter your PIN and Passcode.
   1. sending Access-Request . . .
   1. received Access-Challenge
You must select a new PIN. Do you want the system to generate your new PIN? (y/n) [n]
y
   2. sending Access-Request . . .
   2. received Access-Challenge
Enter a new PIN between 4 and 8 digits:
1234
   3. sending Access-Request . . .
   3. received Access-Challenge
Re-enter new PIN to confirm:
1234
   4. sending Access-Request . . .
   4. received Access-Challenge
PIN accepted. Wait for the tokencode to change, then enter a new PASSCODE:
1234169199
   5. sending Access-Request . . .
   5. received Access-Accept
OK Registration Complete
BackGround RADIUS Messages
1. Code: Access-Request
Identifier: 182
Authentic: 1234567890123456
Attributes:
User-Name="mikem"
Service-Type=Framed-User
NAS-IP-Address=203.63.154.1
NAS-Port=1234
Called-Station-Id="123456789"
Calling-Station-Id="987654321"
NAS-Port-Type=Async
User-Password=
   "<200><185>1<153><153>o4<199><142><10><9><160><216>}x<153>"
1. Code: Access-Challenge
Identifier: 182
Authentic:
   <143>R9<132>X<242><21><184>E<135>?#<9><189><11><228>
Attributes:
State="SECURID=884099926"
Reply-Message="You must select a new PIN. Do you want the system to generate your new PIN? (y/n) [n]"

2. Code: Access-Request
Identifier: 202
Authentic: 1234567890123456
Attributes:
User-Name="mikem"
Service-Type=Framed-User
NAS-IP-Address=203.63.154.1
NAS-Port=1234
Called-Station-Id="123456789"
Calling-Station-Id="987654321"
NAS-Port-Type=Async
User-Password=
   "<151><139>_<173><175>\<4><246><188>8<9><160><216>}x<153>"
State="SECURID=884099926"
2. Code: Access-Challenge
Identifier: 202
Authentic:
   <156><131><25>j<212><154><153><193><201><152>WY?<208><164>d
Attributes:
State="SECURID=884099926"
Reply-Message="Enter a new PIN between 4 and 8 digits:"
3. Code: Access-Request
Identifier: 207
Authentic: 1234567890123456
Attributes:
User-Name="mikem"
Service-Type=Framed-User
NAS-IP-Address=203.63.154.1
NAS-Port=1234
Called-Station-Id="123456789"
Calling-Station-Id="987654321"
NAS-Port-Type=Async
User-Password=
   "<200><185>1<153><175>\<4><246><188>8<9><160><216>}x<153>"
State="SECURID=884099926"
3. Code: Access-Challenge
Identifier: 207
Authentic:
   <151><214>G<132>6S<134>ed<197>k<199>nK6<186>
Attributes:
State="SECURID=884099926"
Reply-Message="Re-enter new PIN to confirm:"
4. Code: Access-Request
Identifier: 208
Authentic: 1234567890123456
Attributes:
User-Name="mikem"
Service-Type=Framed-User
NAS-IP-Address=203.63.154.1
NAS-Port=1234
Called-Station-Id="123456789"
Calling-Station-Id="987654321"
NAS-Port-Type=Async
User-Password=
   "<200><185>1<153><175>\<4><246><188>8<9><160><216>}x<153>"
State="SECURID=884099926"

Figure 5:
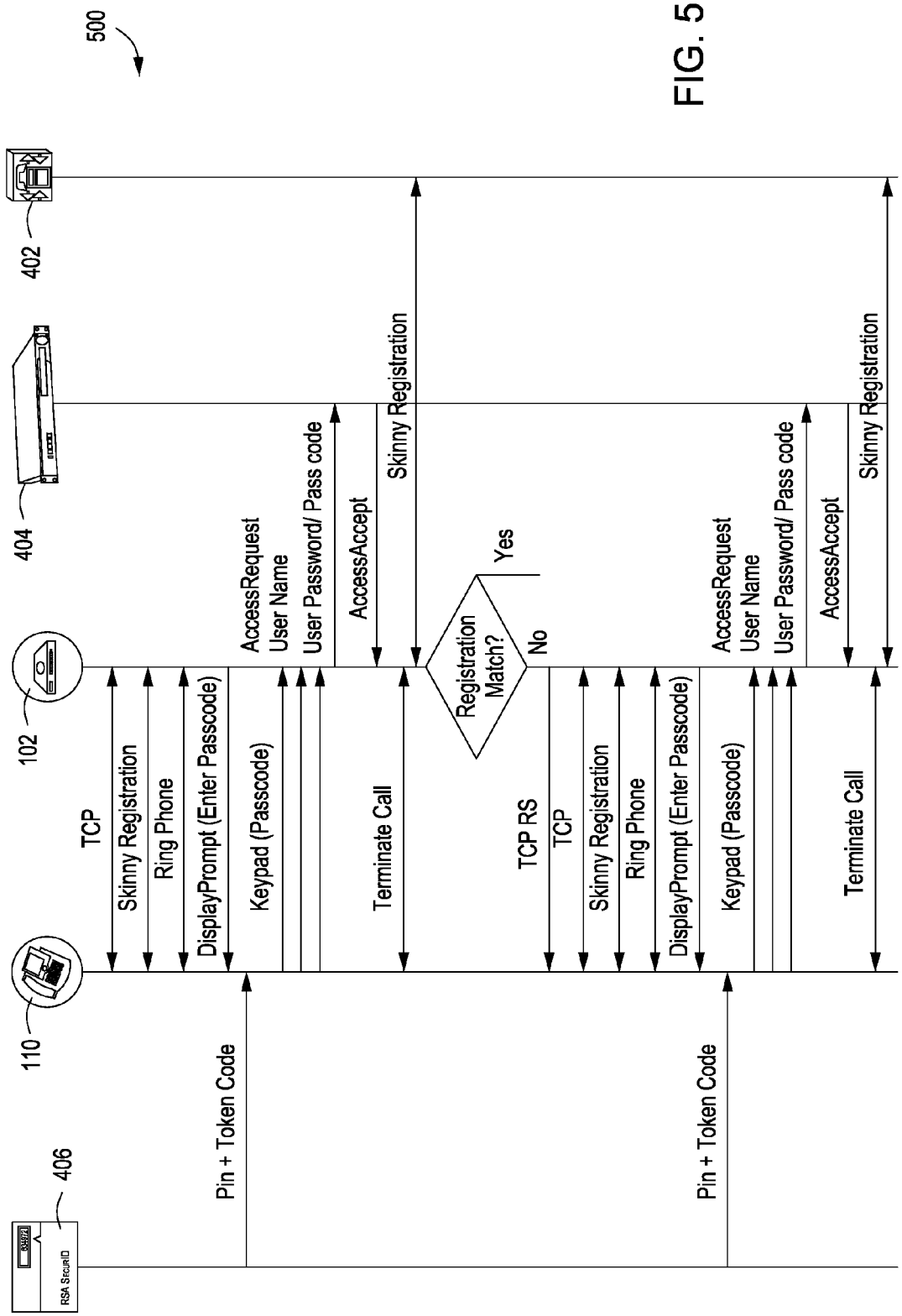
FIG. 5 is a call flow diagram in accordance with one embodiment of the present invention.

4. Code: Access-Challenge
Identifier: 208
Authentic:
   <192><189><30>D<150><211><140>&$Gdz<252><135>S<250>
Attributes:
State="SECURID=884099926"
Reply-Message="PIN accepted. Wait for the tokencode to change, then enter a new PASSCODE:"
5. Code: Access-Request
Identifier: 220
Authentic: 1234567890123456
Attributes:
User-Name="mikem"
Service-Type=Framed-User
NAS-IP-Address=203.63.154.1
NAS-Port=1234
Called-Station-Id="123456789"
Calling-Station-Id="987654321"
NAS-Port-Type=Async
User-Password=
   "<200><185>1<153><158>o0<193><140><8><9><160><216>}x<153>"
State="SECURID=884099926"
5. Code: Access-Accept
Identifier: 220
Authentic:
   <246>>'jM<173>s<17><214><217><220><219>[<243>D<220>
Attributes:

Now referring to FIG. 5, a call flow diagram 500 in accordance with another embodiment of the present invention is illustrated. The solution is described using the SKINNY protocol, but it can also apply to other protocols that are used to setup VoIP (Voice over IP) calls.

Referring now to FIG. 6, a screen shot of a virtual IP configuration table in accordance with one embodiment of the present invention is illustrated. For example, the following rules can be used:
  21. IPCS will use VIP table to configure TFTP proxy rules
  22. The internal firewall should have a rule to allow TFTP port 69 to CCM from EIPCS (not necessary in tunnel mode)
  23. IPCS will request file from random ports (50001, 50002, . . . ) to CCM port 69
  24. The CCM will send files from random port (51001, 51002, . . . ) to corresponding IPCS ports (50001, 50002, . . . )
  25. The external firewall should have a rule to allow TFTP port (69) to VIP address on IPCS
  26. The phone will request file from random ports (52001, 52002, . . . ) to IPCS port 69
  27. The IPCS will send file from "fixed port" 69 to corresponding phone ports (52001, 52002, . . . )
    a. This way we can get around the far end firewall
    b. IPCS needs to keep context on IP address, port basis
  28. The phones will be configured with alternate TFTP server in CCM such that they can transparently move in and out of the Enterprise without changing any configuration TFTP XML Rewriting

| XML TAG | Original IP | Rewrite IP |
| --- | --- | --- |
| <callManagerGroup><br>  <members><br>    <callManager><br>      <processNodeName> | 10.10.100.10 | 192.168.10.30 |
| <callManagerGroup><br>  <members><br>    <members><br>      <callManager><br>        <processNodeName> | 10.10.100.11 | 192.168.10.31 |

```
...
<callManagerGroup>
<members>
<member priority="0">
<callManager>
<ports>
<analogAccessPort>2002</analogAccessPort>
<digitalAccessPort>2001</digitalAccessPort>
<ethernetPhonePort>2000</ethernetPhonePort>
<mgcpPorts>
<listen>2427</listen>
<keepAlive>2428</keepAlive>
</mgcpPorts>
</ports>
<processNodeName>10.10.100.10</processNodeName>
</callManager>
</member>
<member priority="1">
<callManager>
<ports>
<analogAccessPort>2002</analogAccessPort>
<digitalAccessPort>2001</digitalAccessPort>
<ethernetPhonePort>2000</ethernetPhonePort>
<mgcpPorts>
<listen>2427</listen>
<keepAlive>2428</keepAlive>
</mgcpPorts>
</ports>
<processNodeName>10.10.100.11</processNodeName>
</callManager>
</member>
</members>
</callManagerGroup>
...
```

29. IPCS will parse and modify the XML for the SEP<MAC>.cnf xml in accordance with the TFTP rewriting configuration
  30. The xml tags, current value and rewrite value will be configured.

Phone Behavior Analysis

| Phone Behavior |
| --- |
| Whenever Skinny Reset w DEVICE_RESET message |
| is received from call manager<br>Phone sends Un register message<br>CCM sends Un register ack message<br>CCM sends TCP reset<br>Phone requests config file<br>Phone receives config file<br>Phone Registers |
| Whenever Skinny Reset w DEVICE_RESTART message |
| is received from call manager<br>Phone sends Un register message<br>CCM sends Un register ack message<br>CCM sends TCP reset<br>Phone Registers |

| Phone Behavior |
| --- |
| Phone requests config file
Phone receives config file
When # on phone |
| Phone sends Un register message
CCM sends Un register ack message
CCM sends TCP reset
Phone requests config file
Phone receives config file
Phone Registers
When power cycle phone |
| Phone requests config file
Phone receives config file
Phone Registers
Phone requests config file again
Phone receives config file again
Ethernet connect disconnect |
| Phone Registers
Phone requests config file
Phone receives config file |

Figure 7:
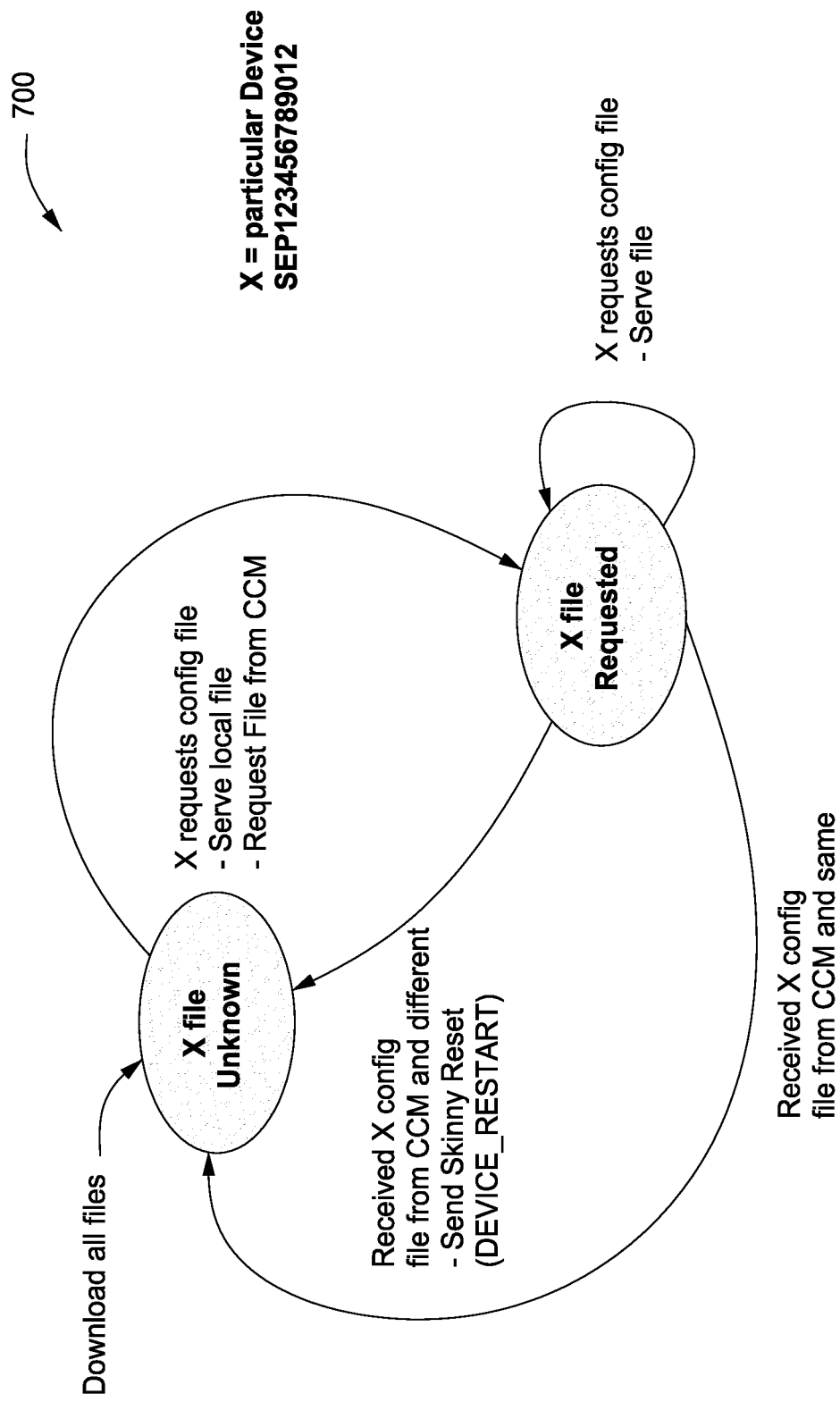
FIG. 7 is a state machine diagram in accordance with one embodiment of the present invention.

Now referring to FIG. 7, a state machine diagram 700 in accordance with one embodiment of the present invention is illustrated.

| Events –> States | X requests config file | CCM serves file same | CCM serves file different |
| --- | --- | --- | --- |
| X File Unknown Entry: - | Action: Serve local file
Request file from CCM
Next State: X File Requested | Not Possible | Not Possible |
| X File Requested Entry: - | Action: Serve local file
Next State: Same | Action: None
Next State: X File Unknown | Action: Send Skinny Reset (DEVICE_RESTART)
Next State: X File Unknown |

An IPCS TFTP Message Sequence is as follows:

31. Whenever phone requests file, IPCS will serve locally available file and IPCS will also request the same file from CCM
32. Always on receiving the file from CCM. IPCS will check if the contents of file have changed from the current version on IPCS and then update the local file.
33. If the file obtained has been modified IPCS will send skinny reset with "DEVICE_RESTART" to phone to force it to update file.
  a. To identify the phone IPCS will rely on Device name in the file name SEP<MAC>.cnf.xml
  b. To identify the phone in case of other files IPCS will rely on connection from same public IP, this will not handle the case of NAT
34. If the file obtained is same as the local copy on IPCS, IPCS will do nothing.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for authenticating an Internet Protocol (IP) phone and a user of the IP phone comprising the steps of:

determining by a security server whether the IP phone is an authorized device;

after determining by the security server whether the IP phone is an authorized device, whenever the IP phone is an authorized device and a trigger condition occurs, authenticating the user of the IP phone by initiating a first call to the IP phone by the security server and sending a request for a passcode to the IP phone as part of the first call;

in response to the security server receiving an invalid passcode, sending a message to disable the IP phone, and terminating the first call;

in response to the security server receiving a valid passcode, enabling access by the IP phone to resources protected by the security server, and terminating the first call; and wherein the IP phone is not running a two factor authentication client application while the security server is determining whether the IP phone is an authorized device and while the first call is active, and wherein an in-band channel established by the first call initiated by the security server is used to authenticate the user of the IP phone.

2. The method as recited in claim 1, wherein:

control messages and voice prompts are used to set up the first call to the IP phone; and the IP phone comprises a dual mode phone, a wireless phone, a soft phone, a web phone, a personal data assistant or an IP-based telecommunications device.

3. The method as recited in claim 1, wherein:
the trigger condition comprises a time-based condition, an event-based condition or a combination thereof;
the time-based condition comprises a requirement to authenticate the IP phone daily, weekly, bi-weekly, monthly, quarterly, yearly or some other specified time; and
the event-based condition comprises receiving a registration request from the IP phone, a switch-over to standby, a challenge from an authentication manager, a request for a specified service, or a request for access to a specified device.

4. The method as recited in claim 3, wherein the trigger condition is any one of receiving a switch-over to standby, receiving a challenge from an authentication manager, or receiving a request for a specified service.

5. The method as recited in claim 1, wherein the IP phone is authenticated by determining that the IP phone is included in a "white-list".

6. The method as recited in claim 1, further comprising the step of generating a security incidence whenever the IP phone is determined not to be an authorized device.

7. The method as recited in claim 1, wherein:
the request for the passcode comprises one or more display prompts, one or more voice prompts or a combination thereof; and
the passcode comprises a personal identification code, a token code, a physical key, an electronic key, a biometric identifier, a magnetic signature, an electronic signature, one or more numbers, one or more symbols, one or more alphabet characters, one or more keystrokes, or a combination thereof.

8. The method as recited in claim 1, further comprising the step of resending the request for the passcode after a specified period of time whenever the user does not answer the first call.

9. The method as recited in claim 1, further comprising the step of sending a message to disable the IP phone after a specified number of consecutive of authentication attempts have failed.

10. The method as recited in claim 1, further comprising the step of notifying the user that the IP phone has been disabled using one or more display messages, audio messages, voice mail messages, electronic mail messages, text messages, or a combination thereof.

11. The method as recited in claim 1, further comprising the steps of initiating another call to the IP phone and sending another request for a passcode to the IP phone after a specified period of time.

12. The method as recited in claim 1, further comprising the step of enabling the IP phone after the IP phone has been disabled using a clearing process executed by the user, a technician, a security person, a supervisor or a combination thereof.

13. The method as recited in claim 1, further comprising the step of requesting authentication of the received passcode from an authentication server.

14. The method as recited in claim 1, further comprising the step of delaying registration of the IP phone with a call manager until the IP phone and the user are authenticated.

15. The method as recited in claim 1, further comprising the steps of:
receiving a request for a configuration file from an IP-phone;
retrieving the configuration file;
sending the configuration file to the IP-phone;
requesting the configuration file from a call manager;
receiving the requested configuration file; and
saving the requested configuration file and sending a reset message to the IP-phone whenever the requested configuration file is different than the configuration file.

16. The method as recited in claim 15, further comprising the steps of:
receiving another request for the configuration file in response to the reset message; and
sending the requested configuration file to the IP-phone.

17. An apparatus for authenticating an Internet Protocol (IP) phone and a user of the IP phone comprising:
a security server comprising a communications interface, a memory, and a processor;
wherein the processor is communicably coupled to the communications interface and the memory, wherein the processor is configured to determine whether the IP phone is an authorized device, and wherein the processor is further configured to determine whether the user of the IP phone is authorized, and after determining by the processor whether the IP phone is an authorized device, and whenever the IP phone is authorized and a trigger condition occurs;
the processor authenticates the IP phone by:
initiating a call to the IP phone via the communications interface;
sending a request for a passcode to the IP phone via the communications interface as part of the call;
receiving a passcode entry from the user;
sending a message to disable the IP phone via the communications interface whenever the passcode entry is invalid;
enabling access to a resource protected by the apparatus whenever the passcode entry is valid;
terminating the call after either disabling the IP phone or enabling access to a resource; and
wherein the IP phone is not running a two factor authentication client application, and wherein an in-band channel established by the call initiated by the processor is used to authenticate the user of the IP phone.

18. A system comprising:
one or more Internet Protocol (IP) phones;
a security server comprising a communications interface, a memory and a processor communicably coupled to the communications interface and the memory; and
an Internet Protocol network communicably coupling the one or more IP phones to the security server;
wherein the processor is configured to determine whether at least a first IP phone included in the one or more IP phones is an authorized device, and to determine whether the user of the first IP phone is authorized, and after determining by the processor whether the IP phone is an authorized device, and whenever the first IP phone is authorized and a trigger condition occurs,
wherein the processor of the security server determines whether the user of the first IP phone is authenticated by initiating a call to the first IP phone via the communications interface, sending a request for a passcode to the first IP phone via the communications interface as part of the call, sending a message to disable the IP phone via the communications interface whenever the passcode is invalid, and terminating the call; and
wherein the IP phone is not running a two factor authentication client application during the authentication process and an in-band channel established by the call initiated by the processor is used to authenticate the user of the IP phone.

19. The system as recited in claim 18, further comprising an authentication server communicably coupled to the Internet Protocol network.

20. The system as recited in claim 18, further comprising a call manager communicably coupled to the Internet Protocol network.

* * * * *